(12) United States Patent
Fukutome et al.

(10) Patent No.: US 11,765,293 B2
(45) Date of Patent: Sep. 19, 2023

(54) DOCUMENT READING APPARATUS AND IMAGE-FORMING DEVICE WITH IMAGE CROPPING MODE

(71) Applicant: SHARP KABUSHIKI KAISHA, Sakai (JP)

(72) Inventors: Shohichi Fukutome, Sakai (JP); Yasumasa Morimoto, Sakai (JP); Hisashi Yamanaka, Sakai (JP); Reishi Aoki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/741,053

(22) Filed: May 10, 2022

(65) Prior Publication Data

US 2022/0385778 A1    Dec. 1, 2022

(30) Foreign Application Priority Data

May 27, 2021    (JP) ................................ 2021-089328

(51) Int. Cl.
*H04N 1/04*     (2006.01)
*H04N 1/00*     (2006.01)

(52) U.S. Cl.
CPC ..... *H04N 1/00801* (2013.01); *H04N 1/00599* (2013.01); *H04N 1/00708* (2013.01); *H04N 1/00718* (2013.01); *H04N 1/00785* (2013.01)

(58) Field of Classification Search
None
See application file for complete search history.

(56) References Cited

U.S. PATENT DOCUMENTS

| | | | | |
|---|---|---|---|---|
| 8,902,480 | B1* | 12/2014 | Taniguchi | H04N 1/0443 358/475 |
| 11,240,393 | B2* | 2/2022 | Horiguchi | H04N 1/00689 |
| 2003/0227125 | A1* | 12/2003 | Nakamura | H04N 1/2032 271/10.11 |
| 2006/0245013 | A1* | 11/2006 | Ikeno | H04N 1/1017 358/487 |
| 2007/0201113 | A1* | 8/2007 | Nishikawa | H04N 1/00909 358/506 |
| 2017/0034387 | A1* | 2/2017 | Horiguchi | H04N 1/121 |
| 2021/0127025 | A1* | 4/2021 | Horiguchi | H04N 1/00737 |
| 2022/0337717 | A1* | 10/2022 | Fujisaki | H04N 1/00816 |

FOREIGN PATENT DOCUMENTS

JP     H02-109463 A    4/1990

* cited by examiner

*Primary Examiner* — Dung D Tran
(74) *Attorney, Agent, or Firm* — ScienBiziP, P.C.

(57) ABSTRACT

A document reading apparatus has a first scanning unit that can scan in a document conveyance direction and determines a document reading position, and a guide plate provided in a position that sandwiches the document being conveyed with the first scanning unit. On a facing surface of the guide plate relative to the first scanning unit, a first color section to which a white sheet is attached and a second color section having a sheet metal color (e.g. gray) of the guide plate are formed in the document conveyance direction. The document reading position corresponds to a position facing the second color section when a document is read in a crop mode.

8 Claims, 6 Drawing Sheets

DOCUMENT READING APPARATUS AND IMAGE-FORMING DEVICE WITH IMAGE CROPPING MODE

BACKGROUND OF THE INVENTION

Field of the Invention

The present disclosure relates to a document reading apparatus having an image cropping mode (crop mode) in which a size or skew of a document is detected and corrected, and an image-forming apparatus including the document reading apparatus.

Description of the Background Art

Multi-copy machines and other image-forming apparatuses include a document reading apparatus that reads an image of a document. The document reading apparatus includes a document reader and a document conveyer disposed on an upper surface of the document reader. The document reading apparatus is capable of conveying documents of a document block disposed on a document tray one by one and automatically reading the documents being conveyed by the document reader.

Furthermore, the document reading apparatus performs shading correction for correcting lens aberrations and uneven illumination in the document reader. The shading correction is performed based on read data obtained by reading reflection light obtained by illuminating a white reference plate with a light source.

In a mode in which an automatic document feed reading is performed on documents being conveyed (automatic document feed reading mode), a document may skew. In general document reading apparatuses, when a document skews, the document is inclined in read image data. To address this problem, document reading apparatuses having a crop mode in which a skew of a document is automatically detected and corrected at a time of document reading have been used.

In the crop mode, a document reading range is set wider than an actual document size and a boundary of the document is detected in read document image data. Then data on an outside relative to the detected boundary (out-of-region data) is cropped (removed), and when remaining data obtained after the out-of-region data is cropped is inclined, the inclination is corrected so that read document data is obtained. Furthermore, not only regular document sizes, such as an A3 size and a B4 size, but also irregular document sizes, such as receipts, may be detected and extracted.

However, in such a crop mode, in a case where white paper is used as a document, when a document reading position in the document reader faces the white reference plate, a boundary of the document may not be reliably detected, and therefore, the out-of-region data may not be reliably cropped. Specifically, in document reading apparatuses in which a white reference plate faces a document reading position all the time, the crop mode may not be realized (or reliability of the crop mode is significantly degraded).

On the other hand, according to Japanese Unexamined Patent Application Publication No. 2-109463, a white reference plate is moved from a document reading position at a time of document reading or a white reference plate is covered by a light-shielding plate at a time of document reading so that cropping is enabled in the automatic document feed reading mode.

However, when the technique disclosed in Japanese Unexamined Patent Application Publication No. 2-109463 is employed, a position of the white reference plate or the light-shielding plate at a time of shading correction is required to be different from that at a time of document reading. That is, the white reference plate or the light-shielding plate is required to be provided as a moving member. Therefore, a configuration of the document reading apparatus becomes complicated and an increase in size and an increase in cost occur as problems.

The present disclosure provides a document reading apparatus and an image-forming apparatus that attain both a simple configuration and a high-accuracy crop mode.

SUMMARY OF THE INVENTION

According to an aspect of the present disclosure, a document reading apparatus having an image cropping mode for detecting a size of and detecting or correcting a skew of a document includes a document conveyer that conveys a document, an image reader that reads a document being conveyed by the document conveyer; and a facing member that is disposed in such a position that a conveyed document is sandwiched with the image reader and that is disposed so as to face the image reader. A first color section having a first color, that is white, and a second color section having a second color, that is different from the first color of the first color section, are formed in a document conveyance direction on a facing surface facing the image reader in the facing member. A document reading position faces the second color section in document reading in the image cropping mode.

According to the above configuration, when a document is read in the image cropping mode, a document reading position faces the second color section (other than white, e.g., gray) so that a highly accurate image cropping mode is realized. Furthermore, in a case where the facing surface is white, it is less likely to cause base fogging of a thin paper document and less likely to produce shadows of a punch-hole document, and accordingly, this case is suitable for a copy mode. Since the document reading position can be changed by moving the reading unit, a movable facing member is not required, and the document reading apparatus can be simplified.

Furthermore, the document reading apparatus may be configured such that the first color section is disposed upstream and the second color section is disposed downstream in the document conveyance direction.

Furthermore, the document reading apparatus may be configured such that, in a mode other than the image cropping mode, when a document being conveyed by the document conveyer is read, the image reader is located at such a position that the document reading position faces the first color section.

Furthermore, the document reading apparatus may be configured such that the facing member has the second color, and the first color section is formed by attaching a white sheet or applying white paint.

Moreover, the document reading apparatus may be configured such that when the document is thick paper, the document reading position is in a further downstream of the first color section and the second color section than when the document is not thick paper.

According to the above configuration, even when the facing member is shifted downstream due to conveyance of a thick paper document, misalignment of the facing member prevents the document reading position from overlapping with the boundary between the first and second color sections.

Moreover, the document reading apparatus may be configured such that setting of the respective document reading positions for the first color section and the second color section is changeable based on read data in the first color section and the second color section, and the setting of the document reading positions is performed for each document reading job in the document reading apparatus.

According to the above configuration, by setting the document reading position based on the read data of the first color section and the second color section, image defects in the read image can be avoided due to contamination of the document reading position (such as dirt adhering to the contact glass).

The document reading apparatus may be configured such that, for the setting of the document reading position, reading is performed in a plurality of reading position candidates so that read data is stored and the document reading position is determined from among the plurality of reading position candidates based on the stored read data.

The document reading apparatus may be configured such that, for the setting of the document reading position, reading is successively performed in a plurality of reading position candidates and when it is determined that a certain one of the reading position candidates is not contaminated, the reading position candidate is determined as the document reading position and reading in the subsequent reading position candidates is omitted.

The document reading apparatus may be configured such that the image reader is located in such a position that the document reading position faces the first color section at a time of shading correction.

According to another aspect of the present disclosure, an image-forming apparatus includes the document reading apparatus described above.

In the document reading apparatus and the image-forming apparatus of the present disclosure, the document reading position faces the second color section (other than white) when a document is read in the image cropping mode so that both a simple device configuration and a highly accurate image cropping mode can be achieved.

DESCRIPTION OF THE PREFERRED EMBODIMENTS

First Embodiment

A first embodiment of the present disclosure will be described in detail hereinafter with reference to the accompanying drawings. Note that, in a description below, an upstream and a downstream indicate those in a document conveyance direction.

Figure 1:
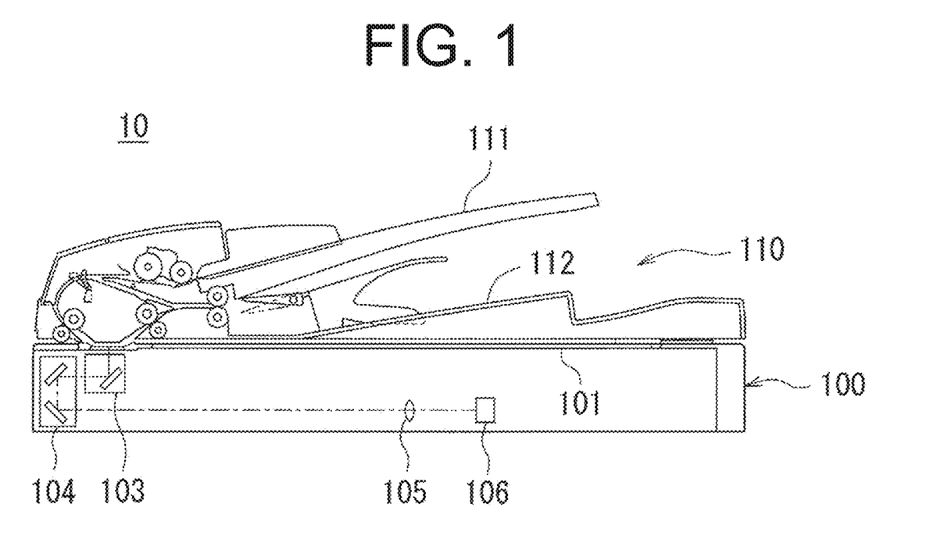
FIG. 1 is a cross-sectional view of a schematic configuration of a document reading apparatus to which the present disclosure is applicable.

FIG. 1 is a cross-sectional view of a schematic configuration of a document reading apparatus 10 to which the present disclosure is applicable. The document reading apparatus 10 included in an image-forming apparatus, such as a photocopier, a multifunction peripheral, a facsimile apparatus, reads an image of a document when the document is to be copied or the document is to be transmitted by facsimile.

Figure 2:
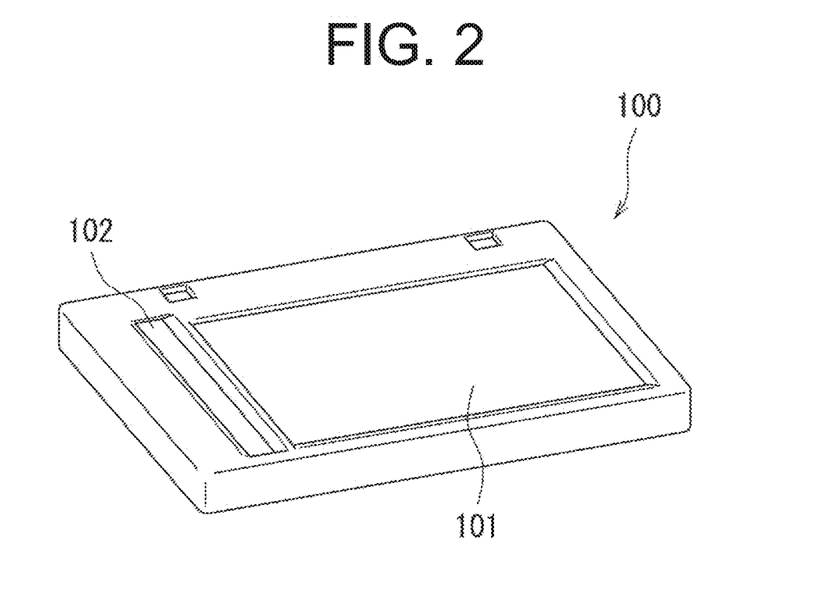
FIG. 2 is a perspective view of an upper surface of a document reader included in the document reading apparatus according to a first embodiment.

The document reading apparatus 10 includes a document reader 100 and an auto document feeder (ADF) 110 disposed on an upper surface of the document reader 100 as illustrated in FIG. 1. The ADF 110 has a depth side axially supported by a depth side of the document reader 100 by a hinge (not illustrated) and is opened and closed by flapping a front portion. FIG. 2 is a perspective view of the upper surface of the document reader 100 in a state in which the ADF 110 is removed. A platen glass 101 and a contact glass 102 are arranged in a document conveyance direction on the upper surface of the document reader 100.

The document reader 100 includes, as a mechanism for reading documents, a first scanning unit 103, a second scanning unit 104, an image forming lens 105, and a CCD (charge coupled device) 106. The first scanning unit 103 includes a light source that irradiates a document with light and a reflection mirror that reflects reflection light from the document (document reflection light) to the second scanning unit 104. The second scanning unit 104 includes a plurality of reflection mirrors that reflect the document reflection light to the image forming lens 105. The image forming lens 105 collects the document reflection light into the CCD 106. CCD 106 reads the incident document reflection light and outputs the document reflection light as read document data.

The document reader 100 broadly has two document reading modes, that is, a manual platen reading mode and an automatic document feed reading mode. Note that, in FIG. 1, positions of the first scanning unit 103 and the second scanning unit 104 are arrangement positions in the automatic document feed reading mode.

In the manual platen reading mode, the ADF 110 is opened so that the platen glass 101 of the document reader 100 is opened before a document is placed on the platen glass 101. The document reader 100 reads an image of a document placed on the platen glass 101 while performing scanning with the first scanning unit 103 and the second scanning unit 104.

In the automatic document feed reading mode, documents of a document block placed on a document tray 111 of the ADF 110 are conveyed one by one by a document conveyer to a document reading region so that the documents are read. Specifically, the document reader 100 reads a document being conveyed while being stopped. In this case, the first scanning unit 103 is located below the contact glass 102, and the document being conveyed to the ADF 110 is imaged when passing over the contact glass 102. That is, in the automatic document feed reading mode, the document reading region is on the contact glass 102. The scanned document is further conveyed to a paper ejection tray 112 of the ADF 110.

Figure 3:
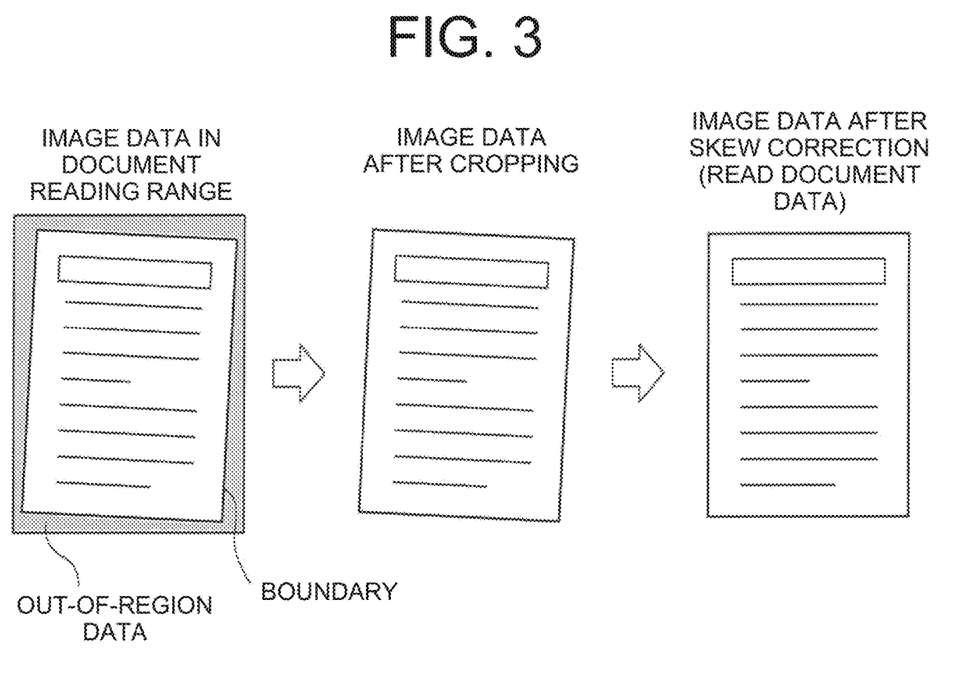
FIG. 3 is a diagram illustrating a procedure of a process in a crop mode in the document reading apparatus.

Furthermore, the document reading apparatus 10 has a crop mode (image cropping mode) in addition to a normal mode in operation in the automatic document feed reading mode. The normal mode, which is a mode other than the crop mode, is a reading mode in which a document reading range is adjusted to an actual document size and image data of the document read by the CCD 106 is output as read document data. On the other hand, in the crop mode, a document reading range is set wider than an actual document size and a boundary of the document is detected using the image data of the document read by the CCD 106 as illustrated in FIG. 3. Then data on an outside relative to the detected boundary (out-of-region data) is cropped (removed), and when remaining data obtained after the out-of-region data is cropped is inclined, the inclination is corrected so that read document data is obtained.

The document reading apparatus 10 according to the first embodiment is characterized in that the crop mode is performed with a simple configuration and high accuracy. This characteristic will be described hereinafter.

Figure 4:
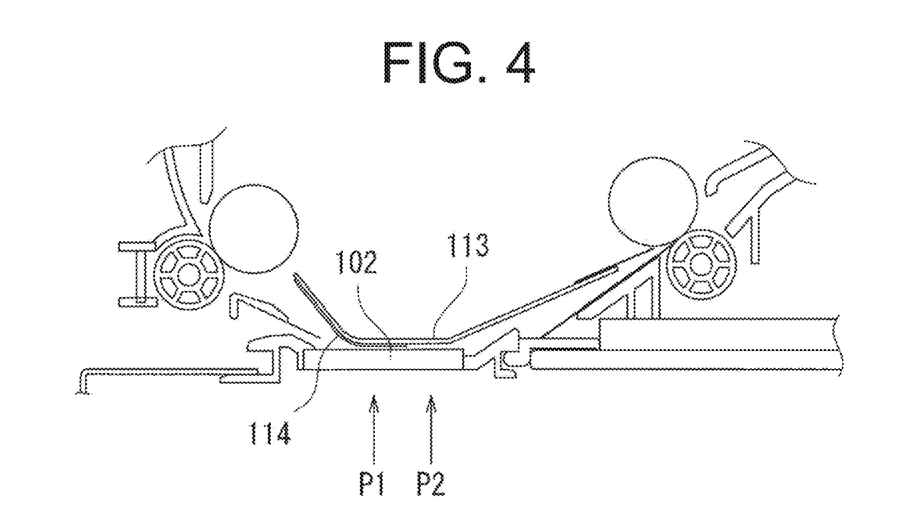
FIG. 4 is an enlarged view of a portion in the vicinity of a document reading region in the document reading apparatus.

FIG. 4 is an enlarged view of a portion in the vicinity of a document reading region in the document reading apparatus 10. As shown in FIG. 4, in the vicinity of the document reading region, a guide plate (facing member) 113 is disposed over the contact glass 102, and a white sheet 114 adheres to a portion of a lower surface (a surface facing the contact glass 102) of the guide plate 113. The guide plate 113 is formed of sheet metal on an ADF 110 side and has a function of pressing a document being conveyed in the document reading region against the contact glass 102 so that the document is tightly in contact with the contact glass 102 in operation in the automatic document feed reading mode. The guide plate 113 is urged to the contact glass 102 by an elastic member (spring member, for example), which is not shown in the figure.

In the document reading region of the document reading apparatus 10, the white sheet 114 is attached on the guide plate 113 on an upstream (left side in FIG. 4) and the sheet metal of the guide plate 113 is exposed on a downstream (right side in FIG. 4). In other words, in the document reading region, on the lower surface of the guide plate 113, the white sheet 114 is attached and a first color section having a first color (i.e., white) and a second color section having a second color (i.e., gray) with exposed sheet metal are formed in the document conveyance direction. Note that the second color is not limited as long as the second color is not white, but is preferably a grayish color that has high contrast with white in all three primary colors R, G, and B. When the second color is gray, a color of the sheet metal of the guide plate 113 may be used as the second color.

Furthermore, since the white sheet 114 is attached to the guide plate 113 on the upstream, and the sheet metal of the guide plate 113 is exposed on the downstream, an inverted step is not formed, and accordingly, document jam does not occur.

When the document reading apparatus 10 reads a document in the normal mode, a document reading position in the document reader 100 is located in a position facing the first color section of the guide plate 113 (upstream reading position P1 in FIG. 4). Specifically, in a case where a document reading position faces the first color section, it is less likely to cause base fogging of a thin paper document and less likely to produce shadows of a punch-hole document, and accordingly, this case is suitable for a copy mode. Furthermore, shading correction may be performed by using the white sheet 114 as a white reference plate. On the other hand, when the document reading apparatus 10 reads a document in the crop mode, a document reading position in the document reader 100 is located in a position facing the second color section of the guide plate 113 (downstream reading position P2 in FIG. 4). Note that the document reading position in the document reader 100 is determined by a position of the first scanning unit 103 in the document reader 100.

Thus, in the document reading apparatus 10, when a document is read in the crop mode, the document reading position is set facing to the second color section of the guide plate 113 so that contrast between an inside and an outside of the boundary of the document becomes larger in image data of the document reading range as shown in a left portion in FIG. 3. As a result, the boundary of the document is easily detected and the out-of-region data can be accurately cropped, and accordingly, a high-accuracy crop mode can be realized.

Note that, with the configuration above, although the first scanning unit 103 (and the second scanning unit 104) is required to be moved to change a document reading position, the first scanning unit 103 and the second scanning unit 104 can originally perform scanning in the manual platen reading mode in the document reading apparatus 10. Therefore, also in the document reader 100, a special change of the configuration for the crop mode is not required.

Note that, although the first color section is formed by attaching the white sheet 114 to the guide plate 113 in the document reading apparatus 10 as described above, the present disclosure is not limited to this, but the first color section may be formed by applying white paint to the guide plate 113. The second color may also be realized in the second color section by sheet application or paint application.

Furthermore, although the first color section is in the upstream and the second color section is in the downstream in the document reading apparatus 10 described above, the present disclosure is not limited to this but the second color section may be in the upstream and the first color section may be in the downstream.

Second Embodiment

In the document reading apparatus 10 according to the first embodiment, the document reading position in the document reader 100 may be changed between the upstream reading position P1 and the downstream reading position P2. In this case, the upstream reading position P1 and the downstream reading position P2 may be certain positions set in advance, but the upstream reading position P1 and the downstream reading position P2 may be changed. In other words, each of the upstream reading position P1 and the downstream reading position P2 may be set so as to be changeable based on read data of the first color section and the second color section, respectively.

For example, when a portion of a surface of the contact glass 102 is contaminated and the contaminated portion overlaps with the document reading position in the automatic document feed reading mode, the read document data has an image defect in a form of a streak in a sub-scanning direction. In such cases, image defects in the read document data can be avoided by changing the document reading position so that the document reading position does not overlap with the contaminated portion. In the second embodiment, a document reading apparatus 10 that can change a document reading position where appropriate so as to set the document reading position at an appropriate location will be described. Note a configuration of the document reading apparatus 10 according to the second embodiment is the same as that of the document reading apparatus 10 according to the first embodiment, and a document reading position can be set by controlling operation in an automatic document feed reading mode.

Figure 5:
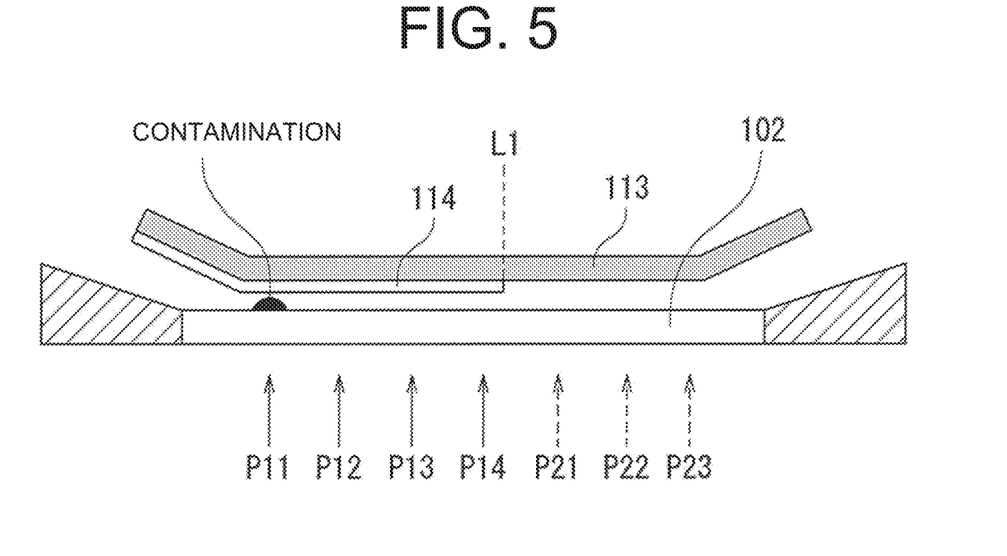
FIG. 5 is a diagram illustrating a method for setting a document reading position employed in a document reading apparatus according to a second embodiment.
Figure 6:
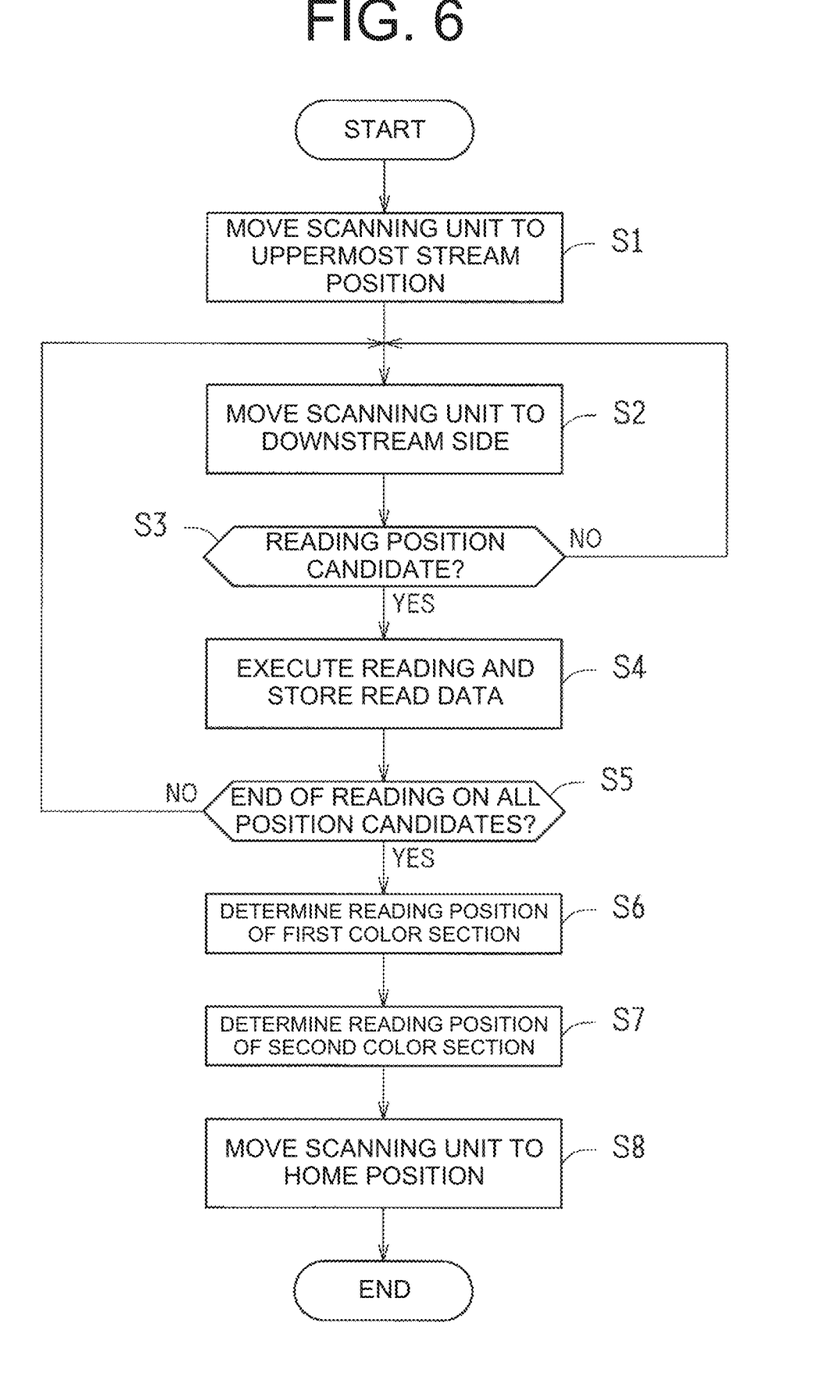
FIG. 6 is a flowchart of a reading operation in an automatic document feed reading mode in the document reading apparatus according to the second embodiment.

FIG. 5 is a diagram illustrating a method for setting a document reading position employed in the document reading apparatus 10 according to the second embodiment. FIG. 6 is a flowchart of a reading operation in the automatic document feed reading mode in the document reading apparatus 10 according to the second embodiment.

As shown in FIG. 5, in the document reading apparatus 10 of the second embodiment, a plurality of reading position candidates are set in each of the first and second color sections. Note that, although four reading position candidates P11 to P14 are set in the first color section, and three reading position candidates P21 to P23 are set in the second color section in the example of FIG. 5, the number of reading position candidates is not particularly limited. The document reading position is set by selecting an appropriate position from among the plurality of reading position candidates.

It is preferable that the setting of the document reading position is performed for each document reading job in the document reading apparatus 10, and it is more preferable that the setting is performed at the end of a job in the document reading apparatus 10. Specifically, when the document reading position is set at the end of a job, the setting of the document reading position is not required to be performed at start of a next job, and therefore, the job can be promptly started. The flowchart in FIG. 6 illustrates a procedure employed when a document reading position is set at the end of a job in the document reading apparatus 10.

When a document reading job in the document reading apparatus 10 is terminated, a setting of a document reading position is started, and a scanning unit in a document reader 100 (a first scanning unit (image reader) 103 and a second scanning unit 104) move to an uppermost stream position (S1) and then start moving downstream (S2).

When a position of the scanning unit reaches one of the reading position candidates (YES in S3), the document reading apparatus 10 executes reading at the reading position candidate and stores data read in the reading position candidate (S4). Then, when reading has not been performed in at least one of the reading position candidates (NO in S5), the process from step S2 to step S4 is performed again. When reading is completed for all the reading position candidates (YES in S5), an appropriate document reading position is determined based on stored read data in the reading position candidates in each of the first and second color sections (S6, S7). Note that an appropriate document reading position indicates a position where the contact glass 102 is clean and read document data does not include image defects.

The method for determining a document reading position will now be described with reference to FIGS. 7A to 7D. FIGS. 7A to 7D are diagrams of examples of read data in reading position candidates, where an axis of ordinates indicates an RGB output value of the CCD 106 and an axis of abscissae indicates a position in the main scan direction.

Figure 7A:
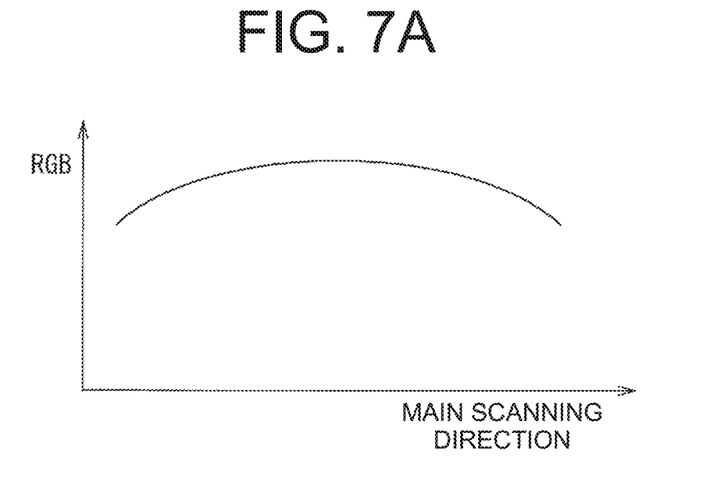
FIG. 7A is a graph of an example of read data in a reading position candidate that is not contaminated in a first color section.

FIG. 7A is a graph of an example of read data in a reading position candidate that is not contaminated in the first color section. The read data has a gently arched shape in the main scanning direction. Specifically, when the read data has a gently arched shape as shown in FIG. 7A, it may be determined that its reading position candidate is not contaminated. Note that the reason that the read data here has a gently arched shape is that the read data before shading correction is used, and therefore, a periphery portion is darker than a center portion due to lens aberration of the image forming lens 105. However, read data after the shading correction may be used to set the document reading position. When read data after the shading correction is used, the read data does not have an arched shape, but has a linear shape with a constant RGB output value (when the reading position candidate is not contaminated).

Figure 7B:
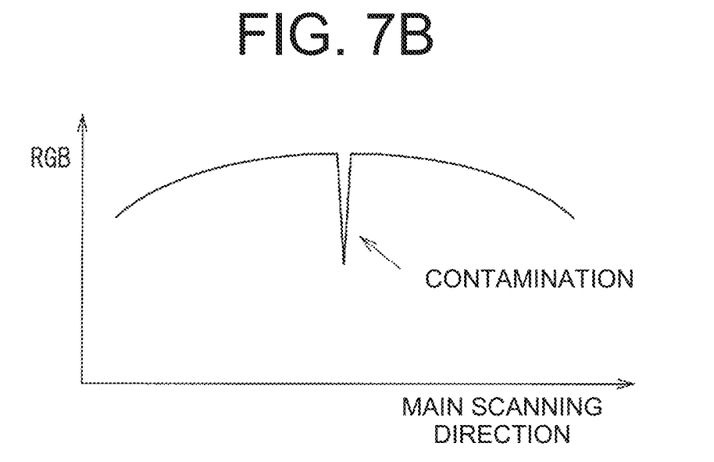
FIG. 7B is a graph of an example of read data in a reading position candidate that is contaminated in the first color section.

FIG. 7B is a graph of an example of read data in a reading position candidate that is contaminated in the first color section. This read data generally has a gently arched shape in the main scanning direction, but an RGB output value significantly (steeply) drops in a contaminated portion. Specifically, as shown in FIG. 7B, when the RGB output value (read value) is reduced in at least a portion of the read data, it may be determined that the reading position candidate is contaminated. In other words, when the RGB output value does not steeply drop in any portion in the main scanning direction, it may be determined that the reading position candidate is not contaminated.

In the example shown in FIG. 5, the reading position candidate P11 is contaminated and the reading position candidates P12 and P13 are not contaminated. In this case, read data in the reading position candidate P11 has the shape shown in FIG. 7B, and read data in the reading position candidates P12 and P13 have the shape shown in FIG. 7A. Consequently, an appropriate document reading position may be selected from among the reading position candidates P12 and P13. Note that, when a plurality of reading position candidates are appropriate for the document reading position, the document reading position may be determined in accordance with a predetermined rule. For example, when a reading position candidate in an upper stream is selected as the document reading position, the reading position candidate P12 is determined as the document reading position in the example of FIG. 5.

Figure 7C:
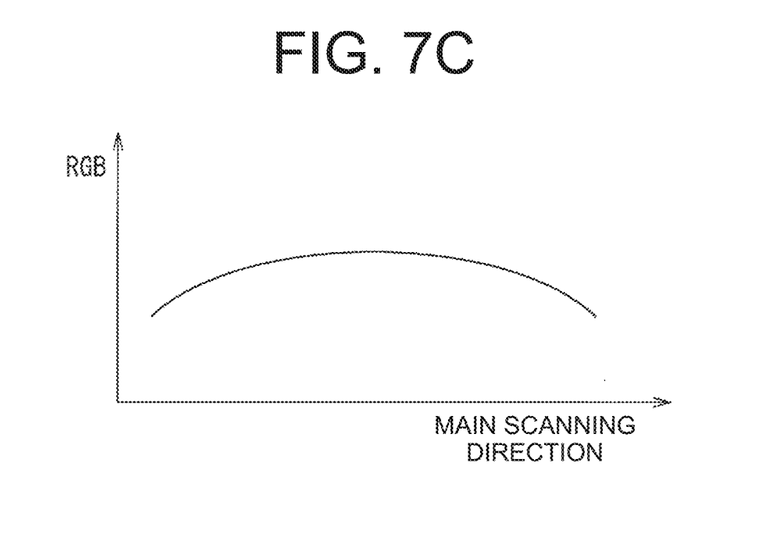
FIG. 7C is a graph of an example of read data in a reading position candidate that is not contaminated in a second color section.

FIG. 7C is a graph of an example of read data in a reading position candidate that is not contaminated in the second color section. The read data has lower RGB output values than the read data in FIG. 7A as a whole, but is the same as the read data in FIG. 7A in that the read data has a gently arched shape in the main scanning direction. Specifically, even in the second color section, when the read data has a gently arched shape as shown in FIG. 7C, it may be determined that the reading position candidate is not contaminated.

Although not shown in the figures, the RGB output value significantly drops in a reading position candidate that is contaminated also in the second color section. Therefore, when the RGB output value is reduced in at least a portion of the read data also in the second color section, it may be determined that the reading position candidate is contaminated. Accordingly, also in the second color section, the same method is used as in the first color section to select an appropriate document reading position from among a plurality of reading position candidates (e.g., reading position candidates P21 to P23 in FIG. 5).

Figure 7D:
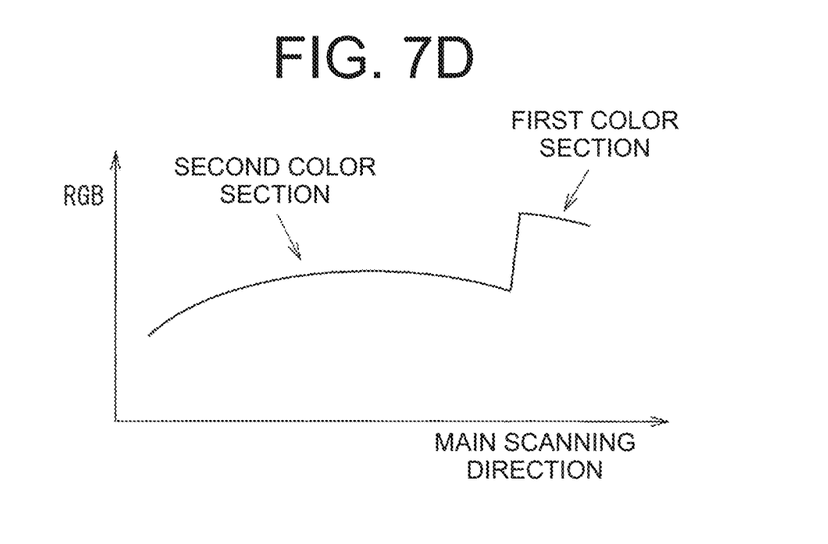
FIG. 7D is a graph of an example of read data in a reading position candidate in the vicinity of a boundary between the first color section and the second color section.

Furthermore, the document reader 100 is inclined relative to the ADF 110, more specifically, reading lines (lines in the main scanning direction) of the document reader 100 are inclined relative to a boundary (a boundary L1 in FIG. 5) between the first color section and the second color section in the ADF 110, read data illustrated in FIG. 7D may be obtained in a reading position candidate set in the vicinity of the boundary L1. The read data in FIG. 7D shows a significant change in an RGB output value in a certain position in the main scanning direction. Such read data is generated when a reading line of the document reader 100 intersects with the boundary L1, and the RGB output value become large in a portion where the reading line overlap with the first color section and become smaller in a portion where the reading line overlaps with the second color section with an intersection point between the reading line and the boundary L1 as a boundary. It is apparent that, even when the read data has the shape shown in FIG. 7D, the reading position candidate is determined to be inappropriate.

Note that, although reading is performed on all of the plurality of reading position candidates and an appropriate document reading position is determined from among these reading position candidates in the document reading apparatus 10 described above, the present disclosure is not limited to this. Specifically, although the reading is sequentially performed for the plurality of reading position candidates, when it is determined that a certain one of the reading position candidates is not contaminated, the reading position candidate is determined to be a document reading position, and reading for the subsequent reading position candidates may be omitted.

For example, as shown in FIG. 5, in a case where the reading position candidate P11 is contaminated but the reading position candidate P12 is not contaminated, reading is performed on the reading position candidates P11 and P12 in turn so that it may be determined that the reading position candidate P12 is not contaminated at a time point when the reading in the reading position candidate P12 is terminated. At this time point, the reading position candidate P12 is determined as the document reading position in the first color section, and reading in the subsequent reading position candidates P13 and P14 may be omitted.

Similarly, since the reading position candidate P21 is not contaminated in the second color section, the reading position candidate P21 is determined as the document reading position in the second color section at a time when the reading in the reading position candidate P21 is terminated, and reading in the subsequent reading position candidates P22 and P23 may be omitted.

Furthermore, although the setting of the document reading position is performed at the end of a job of the document reading apparatus 10 in the document reading apparatus 10 described above, the present disclosure is not limited to this. For example, the document reading position may be set when a normal mode or a crop mode is selected as a use mode of the document reading apparatus 10.

Third Embodiment

When a document reading apparatus 10 is used in an automatic document feed reading mode, dust and dirt may adhere to a contact glass 102 from a document being conveyed. Since such dust and dirt tend to accumulate downstream of the contact glass 102, a document reading position in the document reading apparatus 10 is basically set as far upstream as possible.

Meanwhile, when a thick paper document is read in the automatic document feed reading mode, a guide plate 113 is pushed up by the thick paper document, and therefore, a position of the guide plate 113 may shift downstream when the thick paper document is conveyed. When the document reading position (in particular, a downstream reading position P2) is too close to a boundary L1 between first and second color sections so as to be set as far upstream as possible, proper image reading may not be performed due to misalignment of the guide plate 113.

For example, when the second color section is positioned in the downstream of the first color section and the guide plate 113 is shifted downstream when a document is read in the crop mode, data on a region to be cropped does not entirely become gray and white portions may be mixed in out-of-region data (refer to FIG. 3), and accordingly accuracy of the cropping may be degraded. Furthermore, in a case where the first color section is in the downstream of the second color section and the guide plate 113 is shifted downstream when a document is read in a normal mode, gray portions may be mixed in edges of the read document data (when the conveyed document is skewed).

Therefore, in the document reading apparatus 10, the document reading position may be changed to a further downstream (i.e., the document reading position may be set in a further downstream) when the document is thick paper, when compared with a case where the document is not thick paper (e.g., when the document is plain paper). For example, when the document is thick paper, the document reading position may be offset downstream by a predetermined amount when compared with a case where the document is plain paper or the like. Note that a determination as to whether a document is thick paper may be made by an operation input performed by a user. For example, the document reading apparatus 10 has a thick paper mode for a case where a document is thick paper, and when a user inputs a selection of the thick paper mode using an operation section, the document reading apparatus 10 recognizes that a document is thick paper. Furthermore, only a downstream document reading position (i.e., the downstream reading position P2) is changed downstream.

It should be noted that the embodiments disclosed herein are illustrated as only examples in all respects and do not serve as a basis for a limited interpretation. Therefore, the technical scope of the present disclosure is not interpreted based on only the above-described embodiments but defined based on a statement in the claims. All modifications equivalent to the claims in meaning and scope fall within the scope of the present disclosure.

For example, in the above description, when the second color is grayish, the configuration in which the sheet metal of the guide plate 113 is exposed as the second color section is illustrated, but the present disclosure is not limited to this and the second color section may be configured by being painted grayish or by attaching a grayish sheet.

What is claimed is:

1. A document reading apparatus having an image cropping mode for detecting a size of or detecting and correcting a skew of a document, the document reading apparatus comprising:
   a document conveyer that conveys a document;
   an image reader that reads the document being conveyed by the document conveyer; and a facing member that is disposed in such a position that the conveyed document is sandwiched with the image reader and that is disposed so as to face the image reader, wherein a first color section having a first color, that is white, and a second color section having a second color, that is different from the first color of the first color section, are formed in a document conveyance direction on a facing surface facing the image reader in the facing member, a document reading position for the second color section faces the second color section in document reading in the image cropping mode, a document reading position for the first color section faces the first color section in document reading in a mode other than the image cropping mode, and setting of the respective document reading positions for the first color section and the second color section is changeable based on read data in the first color section and the second color section, and the setting of the document reading positions is performed for each document reading job in the document reading apparatus.

2. The document reading apparatus according to claim 1, wherein the first color section is disposed upstream and the second color section is disposed downstream in the document conveyance direction.

3. The document reading apparatus according to claim 1, wherein the facing member has the second color, and the first color section is formed by attaching a white sheet or applying white paint.

4. The document reading apparatus according to claim 1, wherein when the document is thick paper, the respective document reading positions are in a further downstream of the first color section and the second color section than when the document is not thick paper.

5. The document reading apparatus according to claim 1, wherein for the setting of the respective document reading positions, reading is performed in a plurality of reading position candidates so that read data is stored and the respective document reading positions are determined from among the plurality of reading position candidates based on the stored read data.

6. The document reading apparatus according to claim 1, wherein for the setting of the respective document reading position for each of the first color section and the second color section, reading is successively performed in a plurality of reading position candidates, and when it is determined that a certain one of the reading position candidates is not contaminated, the reading position candidate is determined as the respective document reading position and reading in the subsequent reading position candidates is omitted.

7. The document reading apparatus according to claim 1, wherein the image reader is located in the document reading position for the first color section at a time of shading correction.

8. An image-forming apparatus comprising the document reading apparatus according to claim 1.

* * * * *